United States Patent [19]
Tucker-Peake et al.

[11] Patent Number: 4,758,019
[45] Date of Patent: Jul. 19, 1988

[54] VEHICLE SUSPENSION

[75] Inventors: Adrian Tucker-Peake, Rochester; Stephen P. Rawlings, Keatington, both of Mich.

[73] Assignee: GKN Technology Limited, West Midlands, England

[21] Appl. No.: 52,853

[22] PCT Filed: Aug. 20, 1986

[86] PCT No.: PCT/GB86/00498
§ 371 Date: Apr. 6, 1987
§ 102(e) Date: Apr. 6, 1987

[87] PCT Pub. No.: WO87/01078
PCT Pub. Date: Feb. 26, 1987

[30] Foreign Application Priority Data

Aug. 23, 1985 [GB] United Kingdom ............. 8521143

[51] Int. Cl.$^4$ .............................................. B60G 3/00
[52] U.S. Cl. ................................... 280/699; 280/669; 280/718
[58] Field of Search ............. 280/662, 669, 671, 697, 280/699, 715, 716, 718

[56] References Cited

U.S. PATENT DOCUMENTS 2,499,495  3/1950  Gregory ............................ 280/699

FOREIGN PATENT DOCUMENTS 1170257  5/1964  Fed. Rep. of Germany ...... 280/669
3122417  12/1982 Fed. Rep. of Germany .
3149309  6/1983  Fed. Rep. of Germany .
3338467  5/1985  Fed. Rep. of Germany .
690059   9/1930  France .
8600266  1/1986  United Kingdom .

Primary Examiner—Kenneth R. Rice
Attorney, Agent, or Firm—Marshall, O'Toole, Gerstein, Murray & Bicknell

[57] ABSTRACT

An H-frame vehicle suspension, having pivoted arms joined by a transverse member, has its arms (10) pivoted within enclosures (16) connected to or incorporated in the vehicle structure, such enclosures also containing springs (19) operating on the arms. The springs are preferably of fiber reinforced plastics material.

3 Claims, 2 Drawing Sheets

VEHICLE SUSPENSION

This invention relates to a suspension for a vehicle. Particularly, and in the embodiment hereafter described, the suspension is suitable for the rear wheels of a passenger car, but it will be appreciated the invention is more widely applicable to vehicles generally.

Motor vehicle suspensions of the so-called H-frame type are well known, utilizing a member of generally H-shape in plan view comprising two spaced arms, one at each side of the vehicle, and a transverse element connecting the arms. Each of the arms is pivotally connected to the vehicle structure at its one end and carries a wheel assembly at its other end. The transverse element acts as a bracing member to assist maintenance of the desired relative alignment of the two wheels, and also acts to resist roll of the vehicle by resilient twisting when the wheels attempt to undergo different vertical displacements relative to the vehicle. In such suspensions as proposed hitherto, springing is usually provided by coil springs, operative between the arms and the vehicle structure at positions remote from the arm pivots, although it has also been proposed that leaf springs may be used. Such an arrangement has a disadvantage in that the structure of the vehicle has to be designed to provide space to accommodate the springs, and to take the loads which arise in use at the points where the springs are connected to the vehicle structure. Such suspensions are, however, widely used, particularly for the rear wheels of front-wheel-drive automobiles.

It is the object of the present invention to provide an improved suspension of the H-frame type, in which these disadvantages are overcome or reduced. Further advantages of the suspension according to the invention will be pointed out hereafter.

The present invention provides a suspension for a vehicle, comprising a member of generally H-shape in plan view, having two spaced arms each provided at or adjacent at its one end with means to carry a wheel assembly, and a transverse element extending between said arms, the arms having portions at their other ends which are pivotally connected to the vehicle, wherein each of said pivotal connections is established in an enclosure means connected to or forming part of the structure of the vehicle, each such enclosure means also containing a leaf spring engaging the arm to provide springing between the respective wheel and the vehicle structure.

In a suspension according to the invention, the vehicle structure has to be designed to receive or constitute the enclosure means for each arm of the H-shape member, but no additional provision is necessary for springs remote from the pivots of the arms. It is contemplated that a simplification of the vehicle structure and weight and cost savings may result. In a preferred embodiment of the suspension, the enclosure means form parts of sill structures of the vehicle. In a vehicle such as a passenger car of unitary body construction, the sills of the body structure are strong and rigid, and hence suitable for being provided with pivots for the arms and for engagement with the leaf springs.

Preferably each said leaf spring extends at its one end into the associated arm, is pivotally supported between its ends relative to the arm, and reacts, at or adjacent its other end, against a reaction member within said enclosure means. Preferably each leaf spring is of composite, fibre-reinforced plastics, material, and a pivotal support of each such spring is in alignment with the pivotal connection of the respective arm. Use of leaf springs of fibre reinforced plastics material enables weight to be reduced.

Dampers of telescopic type may be utilised with the suspension according to the invention, such dampers being disposed generally vertically and connected between the arms, adjacent the wheels held thereby, and adjoining parts of the vehicle structure. Such dampers do not occupy as much space as would be required for similarly disposed coil spring, and hence their presence does not greatly detract from the advantages of the invention Further, such dampers may be of the known type providing a self-levelling action.

The invention will now be described by way of example with reference to the accompanying drawings, of which:

Figure 1:
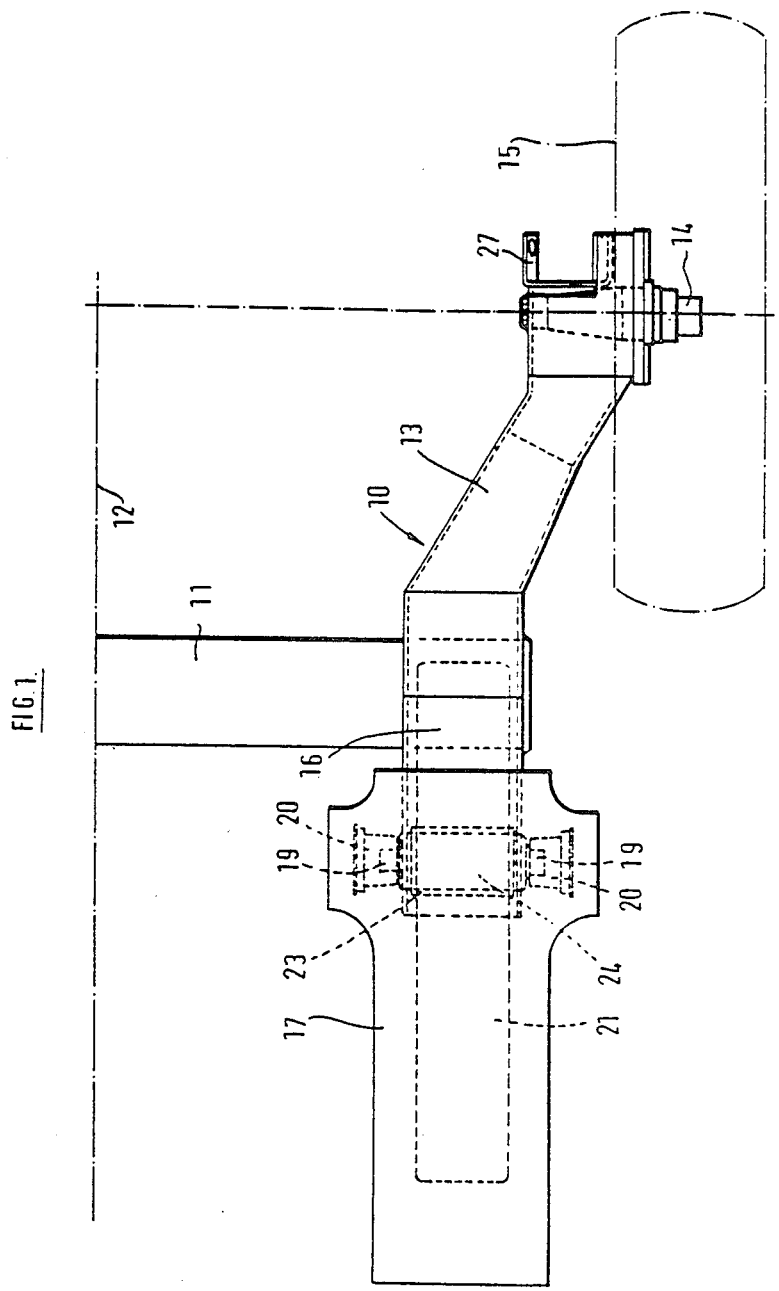
FIG. 1 is a plan view of a suspension according to the invention.
Figure 2:
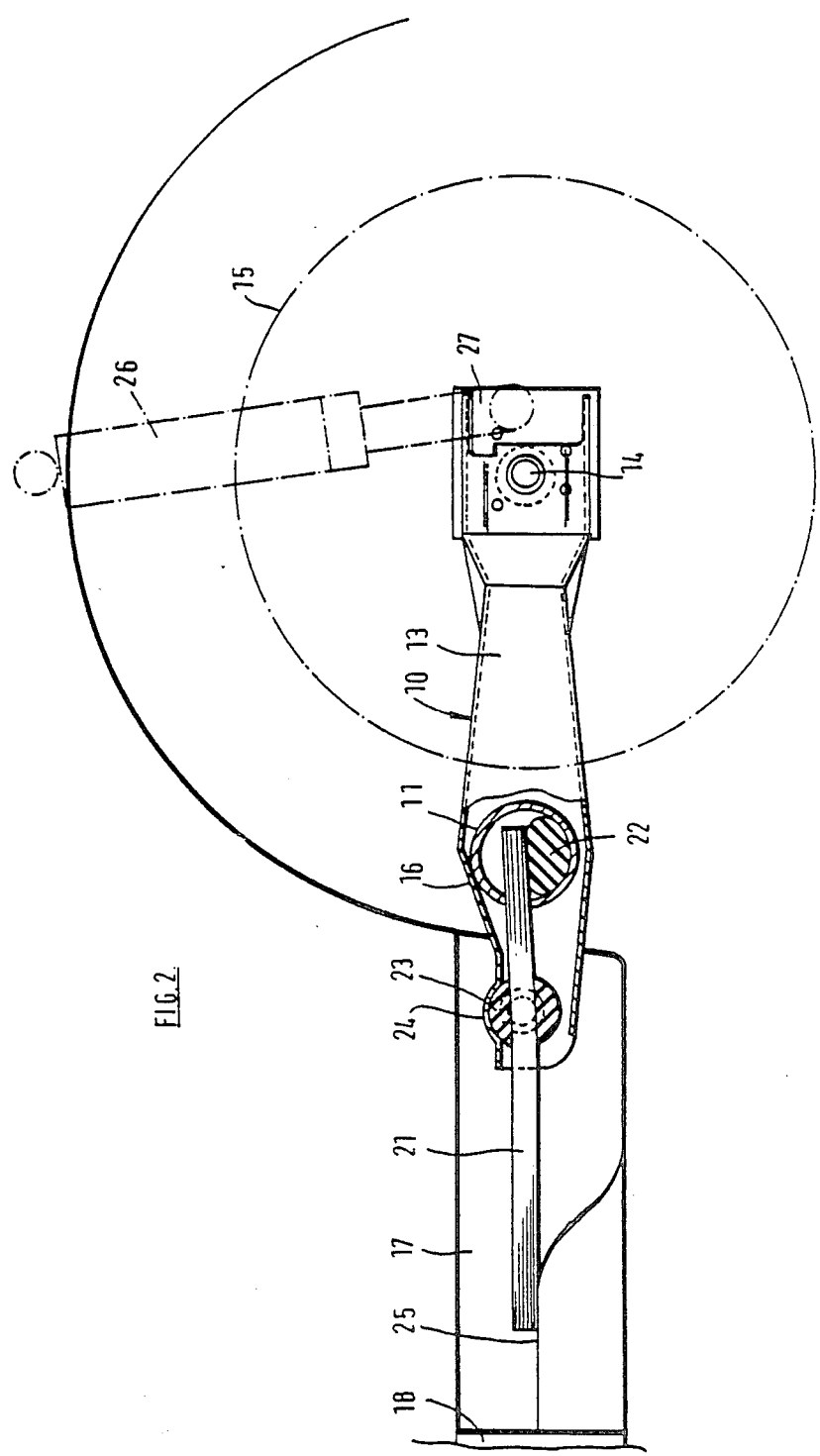
FIG. 2 is an elevation of the suspension of FIG. 1.

The illustrated suspension comprises a member which is of generally H-shape in plan view, having two spaced arms 10 and an element 11 extending transversely of the vehicle between the arms. The longitudinal centre line of the vehicle is indicated at 12, and the parts of the suspension are mirror image identical to one another on opposite sides of the centre line 12. Each arm 10 is fabricated from sheet metal parts welded together, and comprises a portion 13 extending rearwardly and outwardly from the end of the transverse element 11, supporting a stub axle 14 for carrying a wheel indicated in outline at 15. Forwardly of transverse element 11, each arm comprises a box section portion 16, which extends into an enclosure 17 which as illustrated in FIG. 2 of the drawings, may be connected to or form part of a sill structure 18 of a motor vehicle.

The transverse element 11 is of tubular form, and is rigidly secured to the arms 11 so as to be both bent and torsionally deflected when the wheels attempt to undergo different vertical movements from one another relative to the vehicle. In addition to assisting maintenance of desired wheel alignment, element 11 thus resists roll of the vehicle.

The portions 16 of arms 10 are each provided with aligned trunnions 19 which are carried in suitable bushes 20 in the respective enclosure 17, so that the arms are pivotally mounted relative to the vehicle structure.

A leaf spring 21 is provided within each enclosure 17, extending into the interior of the associated arm portion 16. Spring 21 is of composite, fibre-reinforced plastics, material, and is of generally rectangular cross sectional shape and may taper in its thickness. The rearmost end of spring 21 bears down on an abutment surface 22 provided in an end part of tubular transverse member 11 within the arm, and between its ends, in alignment with trunions 19, a part cylindrical bearing element 23 on the spring lies within a correspondingly part cylindrical formation 24 provided in the upper wall of the arm portion 16. The bearing element 23 on the spring may be of a plastics material, e.g. an appropriate grade of nylon, and may be formed in situ on the spring by an injection moulding, possibly a reaction injection moulding, process. At its forward end, spring 21 bears against a reaction surface 25 provided within enclosure 17.

It will be appreciated that springs 21 are subject to bending deflection when the wheels move vertically relative to the vehicle structure. Reaction surfaces 25 within the enclosures 17 may be so shaped that a rising spring rate is obtained, by arranging that as each spring deflects the position of its effective point of abutment with its respective reaction surface is proved lengthwise of the spring towards the associated arm.

Damping of the sprung wheel movement may be obtained by telescopic damper units 26 as shown in FIG. 2, disposing in generally upright orientations and connected between brackets 27, at the ends of arm portions 13, and suitable attachment points on the vehicle structure. Such damper units may be of the known type which provides a self-levelling action.

The invention thus provides a suspension which is readily incorporated in a vehicle and occupies little space as compared with generally known suspensions. Particularly the majority of the space between the wheels is unoccupied by suspension parts, since the dampers 26 do not require large spaces for their accommodation. The springs are disposed in parts of the vehicle which, as explained above, are intrinsically strong and well suited to their accommodation, enabling a simplification in vehicle structure.

We claim:

1. A suspension for a vehicle structure, comprising:
    a member of generally H-shape in plan view, having two spaced arms and an element extending transversely of the vehicle between said arms;
    means at corresponding ends of said arms for carrying wheel assemblies;
    pivot means at the other ends of said arms, for establishing pivotal connections thereof to the vehicle structure;
    respective enclosure means wherein each of said pivotal connections is established, each said enclosure means being connected to the vehicle structure;
    a respective leaf spring of fibre-reinforced plastics material disposed in each said enclosure means;
    a pivotal support for each said spring, said pivotal support being in alignment with the pivotal axis of the respective arm and supporting the spring relative to the arm;
    an abutment surface in the respective arm, abutted by an end of the spring spaced from said pivotal support thereof; and
    a reaction surface within the respective enclosure means, engaged by an opposite end of the spring spaced from said pivotal support thereof, whereby the spring resiliently resists pivotal movement of the respective arm.

2. A suspension according to claim 1 wherein said enclosure means form parts of sill structures (18) of the vehicle.

3. A suspension according to claim 1 wherein said pivotal support is provided by a part-cylindrical formation (23) on the spring occupying a part-cylindrical formation (24) in the arm.

* * * * *